(12) United States Patent
Partridge

(10) Patent No.: US 11,017,328 B2
(45) Date of Patent: *May 25, 2021

(54) METHODS AND SYSTEMS FOR AUTOMATIC REGISTRATION USING PREVIOUSLY USED CREDENTIALS

(71) Applicant: EVENTS ONLINE INC., Ottawa (CA)

(72) Inventor: Stephen Partridge, Luskville (CA)

(73) Assignee: Events Online Inc., Ottawa (CA)

( * ) Notice: Subject to any disclaimer, the term of this patent is extended or adjusted under 35 U.S.C. 154(b) by 103 days.

This patent is subject to a terminal disclaimer.

(21) Appl. No.: 16/405,172

(22) Filed: May 7, 2019

(65) Prior Publication Data
US 2019/0258968 A1    Aug. 22, 2019

Related U.S. Application Data

(63) Continuation of application No. 14/108,612, filed on Dec. 17, 2013, now Pat. No. 10,332,037.

(60) Provisional application No. 61/737,898, filed on Dec. 17, 2012.

(51) Int. Cl.
G06Q 10/02    (2012.01)

(52) U.S. Cl.
CPC .................... G06Q 10/02 (2013.01)

(58) Field of Classification Search
CPC ......... G06Q 10/02; G07B 11/00; G07B 15/00
See application file for complete search history.

(56) References Cited

U.S. PATENT DOCUMENTS

| 7,114,179 B1 * | 9/2006 | Ritter | G06Q 10/02 726/7 |
| 2006/0087454 A1 * | 4/2006 | Le | G07C 1/22 340/988 |
| 2009/0070249 A1 * | 3/2009 | Leach | G06Q 30/02 705/37 |

(Continued)

OTHER PUBLICATIONS

Chan, Chao-Wen, and Ko-Chun Liu. "A digital master-ticket city-pass scheme based on Chameleon hash." Proceedings 2011 International Conference on System Science and Engineering. IEEE, 2011. (Year: 2011).*

(Continued)

*Primary Examiner* — Scott M Tungate
(74) *Attorney, Agent, or Firm* — Rosenberg, Klein & Lee

(57) ABSTRACT

Today an individual attending an event must undertake a second registration and purchasing sequence in order to attend a subsequent occurrence of the event. However, by the time they remember to re-register their interest may have waned or the event is sold out. In other instances, they forget even though the event does not sell out. Accordingly, it would be beneficial to provide registrants of an event with a means to re-register for the next occurrence of the event in a manner that was quick, simple, independent of execution of the registration/purchase steps with a service provider, and independent of completion of service provider support for the next event. Further, it would be beneficial to leverage the credential provided to the registrant for the current event in progress or just completed in the re-registration of the registrant for the next event. It would be further beneficial for said method to leverage the technology and devices of portable electronic devices associated with the registrant.

22 Claims, 8 Drawing Sheets

(56) References Cited

U.S. PATENT DOCUMENTS

2010/0158315 A1* 6/2010 Martin .................... G06F 16/58
382/103
2012/0144452 A1* 6/2012 Dyor .................. H04L 63/0884
726/4

OTHER PUBLICATIONS

Lei, Yaohui, Alejandro Quintero, and Samuel Pierre. "Mobile services access and payment through reusable tickets." Computer Communications 32, No. 4 (2009): 602-610. (Year: 2009).*

* cited by examiner

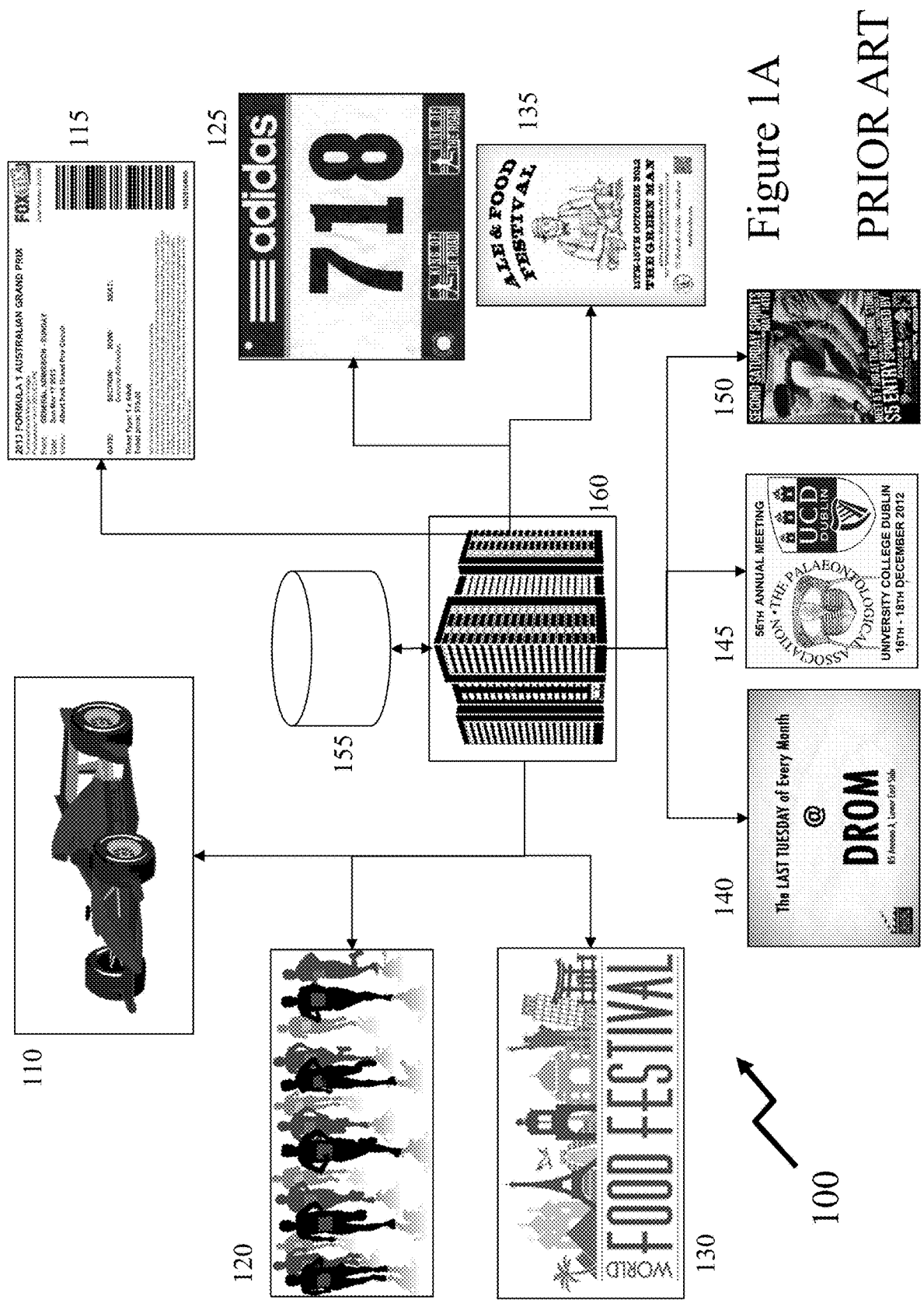

METHODS AND SYSTEMS FOR AUTOMATIC REGISTRATION USING PREVIOUSLY USED CREDENTIALS

CROSS REFERENCED TO RELATED APPLICATIONS

This application claims the benefit of priority as a continuation of U.S. Ser. No. 14/108,612 entitled "Methods and Systems for Automatic Registration using Previously Used Credentials" filed Dec. 17, 2013 which itself claims priority from U.S. 61/737,898 filed Dec. 17, 2012 entitled "Methods and Systems for Automatic Registration using Previously Used Credentials", the entire contents of each being incorporated herein by reference.

FIELD OF THE INVENTION

The present invention relates to event registrations and more particularly to providing user re-registration through presentation of a previously used credential to a preceding occurrence of the event.

BACKGROUND OF THE INVENTION

Athletic or sporting events, especially those that involve individuals or groups of participants, such as for example cross-country races, marathons, walks, and bicycle races for illustration. Each participant in these examples has registered for the event providing personal information, and in most instances financial information, and in return received a unique identifier that distinguishes them from the other participants in the same event. Traditionally, this identifier comprises a "bib number," meaning a number (usually an integer, but it may be alphanumeric or any other defined symbol) that is printed on a "bib placard" (commonly referred to as either a bib or placard) that in turn can be pinned, clipped or otherwise attached to the participant's clothing so that the bib number is visible to an observer during the event. Such a placard is usually made of a flexible but preferably durable, waterproof, material. It may be suspended, for example around the user's neck or arm, rather than attached to the clothing. Alternatively, or in addition, the bib number may be attached to the participant's bicycle, boat, motorcycle, or other equipment within the event.

Likewise, with other sporting events, wherein the registrant is an observer rather than participant, as well as non-sporting events the registrant is provided with a unique identifier that allows them access to the event, i.e. a ticket. Such events may include, but not be limited to, annual general meetings; societies; food festivals; sporting events such as hockey, basketball, football, and soccer; motor racing; film festivals; music festivals; book clubs; and educational seminars. As with the participating events the registrant has registered for the event providing personal information, and in most instances financial information, and in return received the unique identifier, i.e. the ticket, that provides them with access to the event.

Such methods are well known within the prior art having been, in many instances, employed for many decades if not centuries for participants to attend sporting events, seminars, etc. Recently, electronic commerce and the Internet have impacted how registrants register for such events such that an individual may now complete the registration online and the credential/ticket is then mailed, couriered, or electronically provided to them. Bracken in U.S. Patent Application 2012/0,215,571 for example describes a system for printing a ticket by the registrant upon completion of registration wherein the printed ticket is then taken by the registrant to the event, is verified and mated with an event-specific badge holder. In other instances, the ticket is not even printed but is provided electronically and employed electronically at the event, e.g. a 2-D barcode is displayed upon a portable electronic device of the registrant upon attending the event which is recognised by a scanner at the event.

However, within these prior art systems and methods a registrant wishing to register for the next event, e.g. next year's New York marathon, the next Yankees baseball game, or the next annual food and wine festival having just attended that event must access a service provider associated with the event and complete a new registration process. Whilst in some instances the user may have an account with the service provider, e.g. a ticket seller such as Tickets-Now™, they must still go through the process of selecting the next event, completing the associated registration steps, and submit payment. However, in the majority of instances the next event will not be accessible through this service provider at that point in time or may only become available through another service provider as the event's organizers change service provider affiliation. Accordingly, opportunities to re-register the registrant are missed, particularly where the next event registration is not available through the service provider for a period of time after the current event, e.g. several months as details are not finalized. In other situations, the opportunity to up-sell a registrant is missed as their current pleasurable experience at the event is not leveraged into a registration at an increased service level for the next event.

Accordingly, it would be beneficial to provide registrants of an event with a means to re-register for the next occurrence of the event in a manner that was quick, simple, independent of execution of the registration/purchase steps with a service provider, and independent of completion of service provider support for the next event. Accordingly, it would be beneficial to leverage the credential provided to the registrant for the current event in progress or just completed in the re-registration of the registrant for the next event. It would be further beneficial for said method to leverage the technology and devices of portable electronic devices associated with the registrant.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate drawbacks within the prior art relating to event registrations and more particularly to providing user re-registration through presentation of a previously used credential to a preceding occurrence of the event.

In accordance with an embodiment of the invention there is provided a method comprising:
providing from a microprocessor based computer system to a registrant a credential relating to an authorization for a first event involving the registrant;
terminating the credential's ability to authorize the registrant for the first event;
receiving from the registrant at the microprocessor based computer system a representation of the credential issues to the registrant; and automatically with the microprocessor based computer system registering the participant for a second event.

In accordance with an embodiment of the invention there is provided a method comprising providing from a microprocessor based computer system to a registrant a credential relating to an authorization for a first event involving the registrant, receiving from the registrant at the microprocessor based computer system a representation of the credential issues to the registrant, and automatically with the microprocessor based computer system registering the participant for a second event.

In accordance with an embodiment of the invention there is provided a method comprising providing from a microprocessor based computer system to a registrant a credential relating to an authorization for a first event involving the registrant, providing an electronic message to the recipient at an electronic address associated with the registrant indicating that they are able to register for a second event, receiving from the registrant at the microprocessor based computer system a representation of the credential issues to the registrant, and automatically with the microprocessor based computer system registering the participant for the second event.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1A depicts registration and event credential provisioning according to the prior art;

DETAILED DESCRIPTION

Figure 1B:
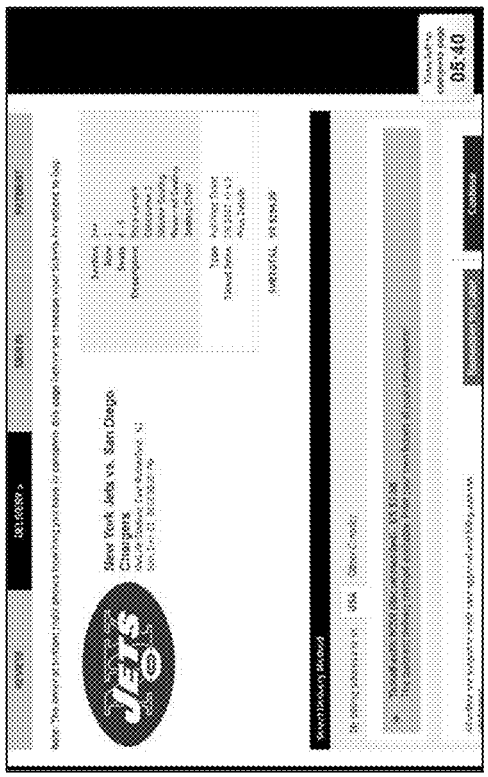
FIG. 1B depicts a typical online seat and delivery method selection for a registrant of an event according to the prior art.
Figure 1B:
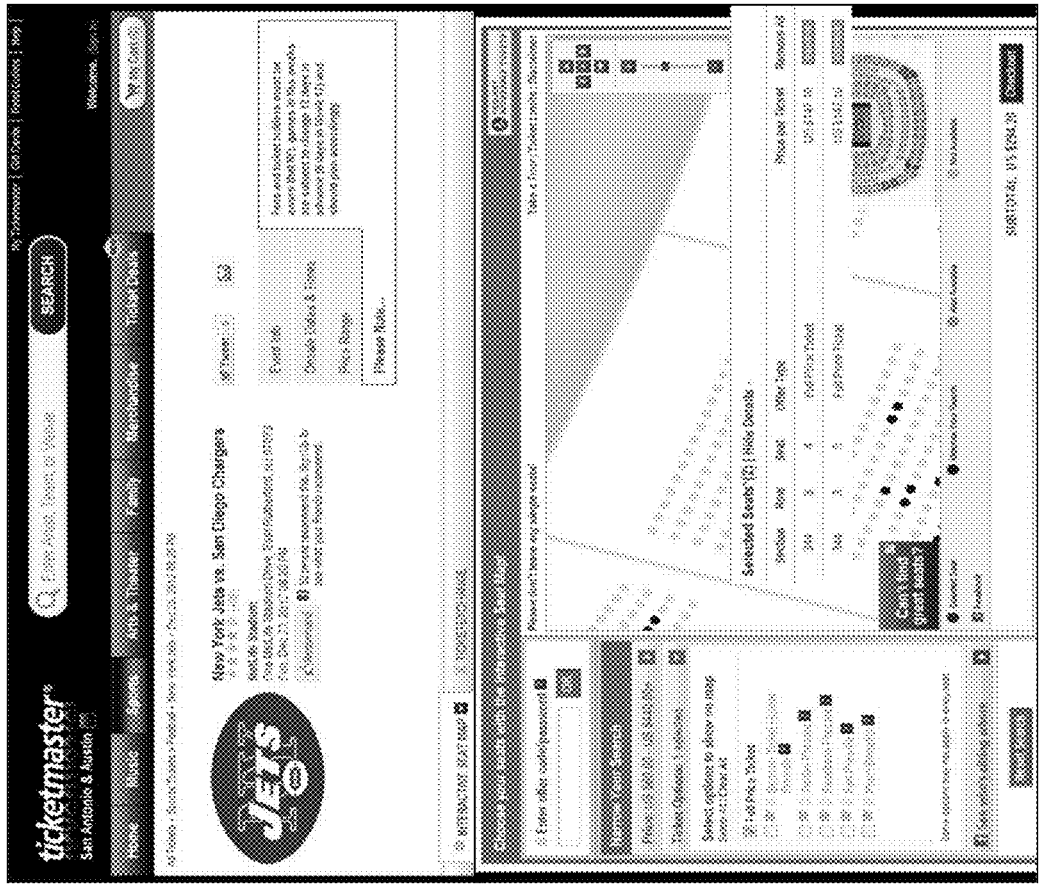

The present invention is directed to event registrations and more particularly to providing user re-registration through presentation of a previously used credential to a preceding occurrence of the event.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "event" as used herein may refer to, but is not limited to, an activity at which a registrant partakes within the activity, such as for example an annual marathon, an amateur race, a charity walk, a festival, a reunion, and a lecture wherein a subsequent occurrence of the event will occur in the future, e.g. next month, next quarter, or next year. An "event" as used herein may also refer to, but is not limited to, an activity at which a registrant is a spectator or passive participant not partaking within the activity, such as for example a sports game, an award ceremony, and a concert wherein a subsequent occurrence of the event or a similar event will occur in the future, e.g. next month, next quarter, or next year.

A "credential" as used herein may refer to, but is not limited to, a physical or electronic artifact providing the possessor (e.g. registrant) with access to an event. A "registrant" as used herein may refer to, but is not limited to, an individual who purchases a credential for an event. Within this specification the use of an element in the singular does not necessarily preclude the use of multiple occurrences of the element nor does the use of an element in the plural necessarily preclude the use of the element.

A "social network" (SOCNET) or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" (SOME) or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

Referring to FIG. 1A there is depicted a registration and event credential provisioning schematic 100 according to the prior art. Accordingly, as depicted a credential provider 160 operates a service providing credentials to events for registrants across multiple event types through a web based application allowing users to access through the Internet (not depicted for clarity) and register for an event or events. Depending upon the event then a financial transaction may also be undertaken as part of the registration process as would be known by someone of skill in the art. Accordingly, a user may browse and select events including motor racing 110, charity race 120, food festival 130, comedy club 140, Paleontological Association annual meeting 150, ale and food festival 135, and cycling event 160. The information relating to these events being stored within a database or databases upon a server 155 or plurality of servers 155.

Accordingly, a user (not shown for clarity) registers with the credential provider 160 for motor racing 110 and a local marathon 120 known as "King of the Road." Part of an exemplary event selection process according to an online web-based credential supplier, e.g. TicketMaster, is presented in first image 170 within FIG. 1B wherein the registrant has selected the New York Jets for their Dec. 23, 2012 home game against the San Diego Chargers. They have also established seat selections Section 344, Row 3, Seats 4 and 5 for $147.10 each. In second image 180 the registrant has presented to them delivery options by the credential provider 160, in this case only TicketFast™ Now which allows the registrant to print the credential (ticket) at home is available for an addition $2.50 per ticket.

With respect to FIG. 1A the user was presented with other options due to the options provided by the event organizers and/or the credential provider 160. Accordingly, the registrant's registration is stored within a database within server 155. In the instance of motor racing 110 the registrant is provided only the options of receiving the racing credential 115 via post or courier as the credential is a plastic pass. In the instance of charity race 120 the registrant was provided with delivery and print-at-home options for the marathon credential 125. In this instance the registrant had marathon credential 125 sent to them wherein the marathon credential 125 was printed onto fabric and/or plastic rather than simply paper. Racing credential 115 is intended to provide access to the motor racing event whereas marathon credential 125 is intended to identify the registrant as they participate within the actual event. Under some circumstances the registrant may be required to provide additional identification to verify their identity for the marathon.

It would be evident to one skilled in the art that the racing credential 115 and marathon credential 125 permit no other activity to be performed by the registrant. In fact, under some circumstances the presentation of such a credential may not provide access to the event for the registrant once a predetermined point in time has passed, for example the motor racing 110 event has reached halfway or the charity race 120 has started. Within the prior art once the event to which the credential is associated has completed then the credential has no functionality.

Figure 2:
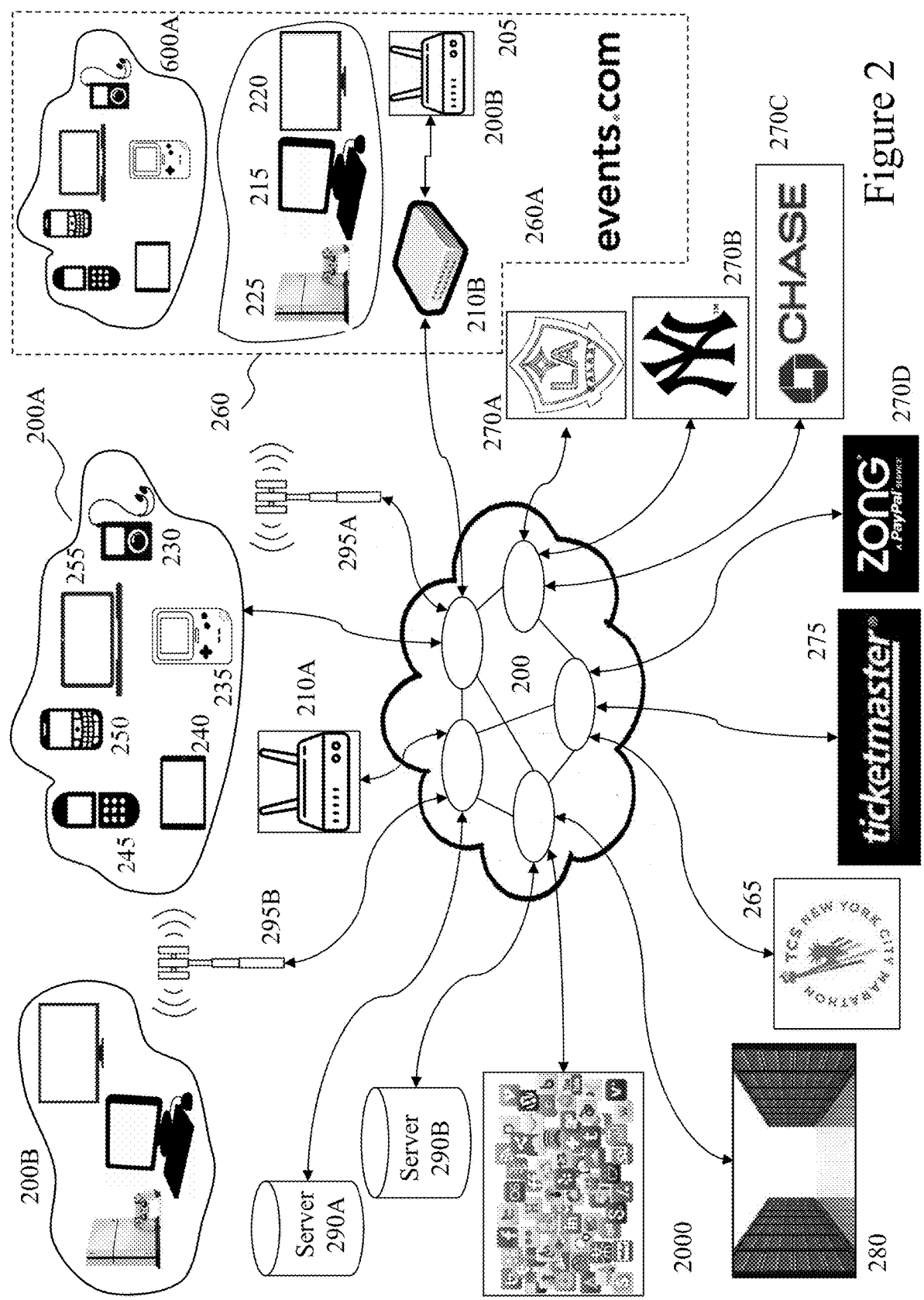
FIG. 2 depicts an exemplary network connecting registrants with event providers and service providers of event credentials supporting embodiments of the invention.

Now referring to FIG. 2 there is depicted a network 200 supporting communications to and from electronic devices allowing registrants, event providers, and service providers of event credentials to communicate according to the requirements of embodiments of the invention. As shown first and second user groups 200A and 200B respectively interface to a telecommunications network 200. Within the representative telecommunication architecture, a remote central exchange 280 communicates with the remainder of a telecommunication service providers network via the network 200 which may include for example long-haul OC-48/OC-192 backbone elements, an OC-48 wide area network (WAN), a Passive Optical Network, and a Wireless Link. The central exchange 280 is connected via the network 200 to local, regional, and international exchanges (not shown for clarity) and therein through network 200 to first and second wireless access points (AP) 295A and 295B respectively which provide Wi-Fi cells for first and second user groups 200A and 200B respectively. Also connected to the network 200 are first and second Wi-Fi nodes 210A and 210B, the latter of which being coupled to network 200 via router 205. Second Wi-Fi node 210B is associated with sponsor 260A, in this instance the US Government, and environment 260 within which are first and second user groups 200A and 200B. Second user group 200B may also be connected to the network 200 via wired interfaces including, but not limited to, DSL, Dial-Up, DOCSIS, Ethernet, G.hn, ISDN, MoCA, PON, and Power line communication (PLC) which may or may not be routed through a router such as router 205.

Within the cell associated with first AP 210A the first group of users 200A may employ a variety of portable electronic devices including for example, laptop computer 255, portable gaming console 235, tablet computer 240, smartphone 250, cellular telephone 245 as well as portable multimedia player 230. Within the cell associated with second AP 210B are the second group of users 200B which may employ a variety of fixed electronic devices including for example gaming console 225, personal computer 215 and wireless/Internet enabled television 220 as well as cable modem 205.

Also connected to the network 200 are first and second APs which provide, for example, cellular GSM (Global System for Mobile Communications) telephony services as well as 3G and 4G evolved services with enhanced data transport support. Second AP 295B provides coverage in the exemplary embodiment to first and second user groups 200A and 200B. Alternatively the first and second user groups 200A and 200B may be geographically disparate and access the network 200 through multiple APs, not shown for clarity, distributed geographically by the network operator or operators. First AP 295A as show provides coverage to first user group 200A and environment 260, which comprises second user group 200B as well as first user group 200A. Accordingly, the first and second user groups 200A and 200B may according to their particular communications interfaces communicate to the network 200 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.28, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 200A may form associations either through standards such as IEEE 802.15 and Bluetooth as well in an ad-hoc manner.

Also connected to the network 200 are registration service 275, in this instance TicketMaster™ which provides users with the ability to search and procure tickets (one form on event credential), first partner enterprise 265, New York City Marathon who host an event for which credentials/registrations are required, and second and third partner enterprises 270A and 270B respectively, being the Los Angeles Galaxy and New York Yankees who similarly host events for which credentials/registrations are required to gain access. Also depicted are first and second financial partners 270C and 270D respectively, being Chase Bank and Zong representing financial service providers who may be associated with financial transactions of registrants with partner enterprises in order to complete the registration process. These together with first and second servers 290A and 290B, which together with others not shown for clarity, may host according to embodiments of the inventions multiple services associated with a provider of the software operating system(s) and/or software application(s) associated with the electronic device(s), a provider of the electronic device, provider of one or more aspects of wired and/or wireless communications, event databases, registration databases, credential identification databases, license databases, customer databases, websites, and software applications for download to or access by fixed and portable electronic devices. First and second primary content sources 290A and 290B may also host for example other Internet services such as a search engine, financial services, third party applications and other Internet based services.

Accordingly, the registration service 275, first partner enterprise 265, second and third partner enterprises 270A and 270B respectively, and first and second financial partners 270C and 270D respectively coupled to network 200 allow for a software system and/or software application such as described in respect of exemplary embodiments of the invention for providing one or more registrants with registration to a first event, issuance of a credential for the event, and the subsequent re-registration to a second event of the user based upon a predetermined portion of the first event credential. It would be evident that in some embodiments of the invention only one enterprise may be required in order to provide the software system and/or software application for implementation but in other embodiments two or more enterprises may provide different elements of the overall software system and/or software application.

Also connected to the network 200 are SOCNETs/SOMEs 2000 representing one or more social networks. Accordingly, the registration service 275, first partner enterprise 265, and second and third partner enterprises 270A and 270B respectively may each establish a presence within one or more social networks, e.g. Facebook™ and Twitter™, allow users to follow the organizations associated with the registration service 275, first partner enterprise 265, and second and third partner enterprises 270A and 270B respectively in order to obtain information, receive notifications, register, see what others following an organization are posting, etc.

Figure 3:
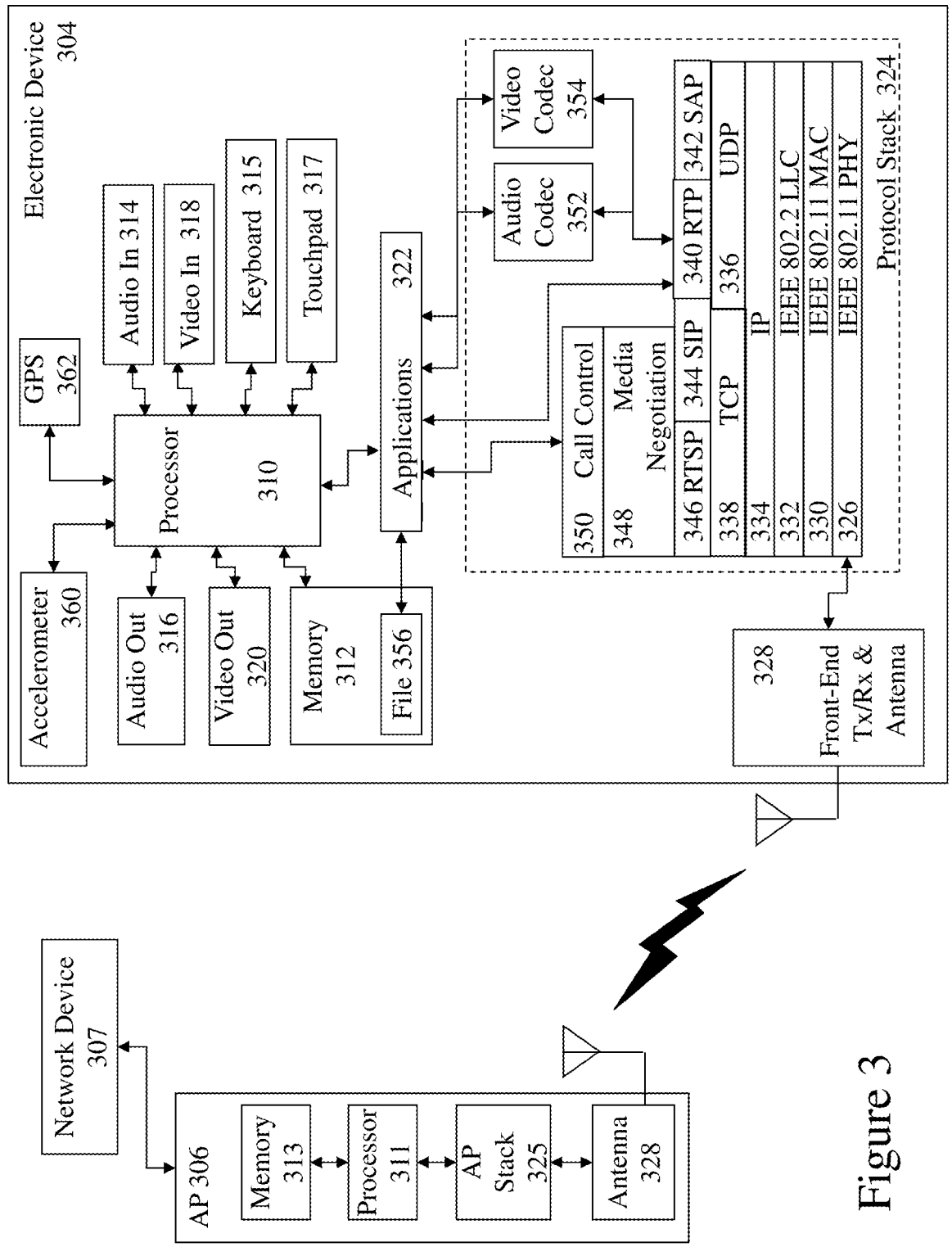
FIG. 3 depicts an exemplary portable electronic device and network access point supporting embodiments of the invention.

Within the embodiments of the invention described within this specification registrants, participants, users, business operators, enterprise personnel etc may access software application and/or software system through either a PED or a FED, i.e. an electronic device. Referring to FIG. 3 there is depicted an electronic device 304 and network access point 307 supporting a software system and/or software application according to embodiments of the invention. Electronic device 304 may for example be a portable electronic device or a fixed electronic device and may include additional elements above and beyond those described and depicted. Also depicted within the electronic device 304 is the protocol architecture as part of a simplified functional diagram of a system 300 that includes an electronic device 304, such as a smartphone 255, an access point (AP) 306, such as first AP 210, and one or more network devices 307, such as communication servers, streaming media servers, and routers for example such as first and second servers 290A and 290B respectively. Network devices 307 may be coupled to AP 306 via any combination of networks, wired, wireless and/or optical communication links such as discussed above in respect of FIG. 1A. The electronic device 304 includes one or more processors 310 and a memory 312 coupled to processor(s) 310. AP 306 also includes one or more processors 311 and a memory 313 coupled to processor(s) 311. A non-exhaustive list of examples for any of processors 310 and 311 includes a central processing unit (CPU), a digital signal processor (DSP), a reduced instruction set computer (RISC), a complex instruction set computer (CISC) and the like. Furthermore, any of processors 310 and 311 may be part of application specific integrated circuits (ASICs) or may be a part of application specific standard products (ASSPs). A non-exhaustive list of examples for memories 312 and 313 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 304 may include an audio input element 314, for example a microphone, and an audio output element 316, for example, a speaker, coupled to any of processors 310. Electronic device 304 may include a video input element 318, for example, a video camera, and a video output element 320, for example an LCD display, coupled to any of processors 310. Electronic device 304 also includes a keyboard 315 and touchpad 317 which may for example be a physical keyboard and touchpad allowing the user to enter content or select functions within one of more applications 322. Alternatively, the keyboard 315 and touchpad 317 may be predetermined regions of a touch sensitive element forming part of the display within the electronic device 304. The one or more applications 322 that are typically stored in memory 312 and are executable by any combination of processors 310. Electronic device 304 also includes accelerometer 360 providing three-dimensional motion input to the process 310 and GPS 362 which provides geographical location information to processor 310.

Electronic device 304 includes a protocol stack 324 and AP 306 includes a communication stack 325. Within system 300 protocol stack 324 is shown as IEEE 802.11 protocol stack but alternatively may exploit other protocol stacks such as an Internet Engineering Task Force (IETF) multimedia protocol stack for example. Likewise, AP stack 325 exploits a protocol stack but is not expanded for clarity. Elements of protocol stack 324 and AP stack 325 may be implemented in any combination of software, firmware and/or hardware. Protocol stack 324 includes an IEEE 802.11-compatible PHY module 326 that is coupled to one or more Front-End Tx/Rx & Antenna 328, an IEEE 802.11-compatible MAC module 330 coupled to an IEEE 802.2-compatible LLC module 332. Protocol stack 324 includes a network layer IP module 334, a transport layer User Datagram Protocol (UDP) module 336 and a transport layer Transmission Control Protocol (TCP) module 338.

Protocol stack 324 also includes a session layer Real Time Transport Protocol (RTP) module 340, a Session Announcement Protocol (SAP) module 342, a Session Initiation Protocol (SIP) module 344 and a Real Time Streaming Protocol (RTSP) module 346. Protocol stack 324 includes a presentation layer media negotiation module 348, a call control module 350, one or more audio codecs 352 and one or more video codecs 354. Applications 322 may be able to create maintain and/or terminate communication sessions with any of devices 307 by way of AP 306. Typically, applications 322 may activate any of the SAP, SIP, RTSP, media negotiation and call control modules for that purpose. Typically, information may propagate from the SAP, SIP, RTSP, media negotiation and call control modules to PHY module 326 through TCP module 338, IP module 334, LLC module 332 and MAC module 330.

It would be apparent to one skilled in the art that elements of the electronic device 304 may also be implemented within the AP 306 including but not limited to one or more elements of the protocol stack 324, including for example an IEEE 802.11-compatible PHY module, an IEEE 802.11-compatible MAC module, and an IEEE 802.2-compatible LLC module 332. The AP 306 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

Portable and fixed electronic devices represented by electronic device 304 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Figure 4:
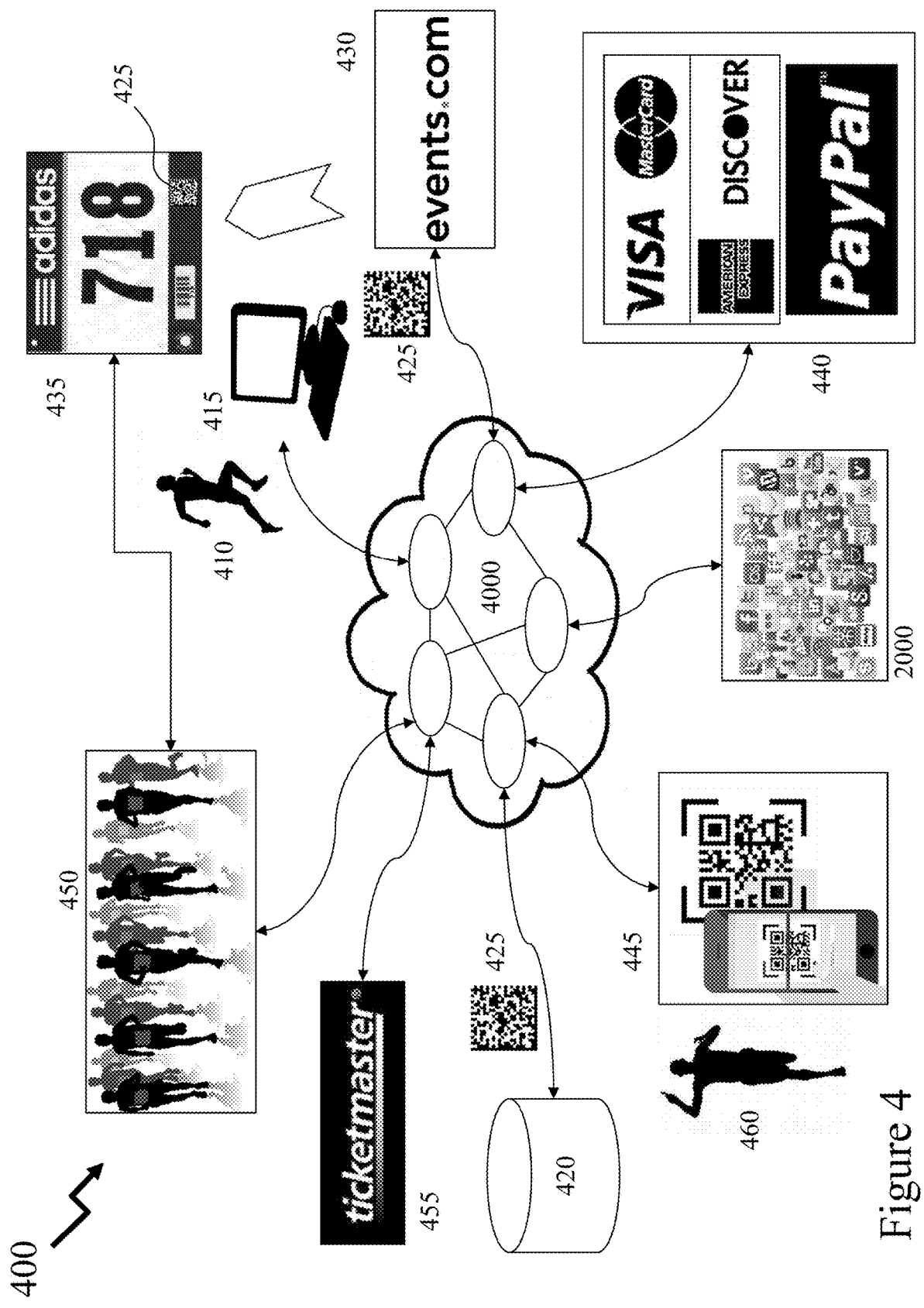
FIG. 4 depicts an exemplary association of event, registrant, event credential and service provider according to an embodiment of the invention.

Now referring FIG. 4 these is depicted an exemplary association 400 of race event 450, registrant 410, event credential 435 and service provider 455 according to an embodiment of the invention. Accordingly, a registrant 410 wishes to register for a race event 450 and accesses a service provider 455, e.g. TicketMaster™, wherein they can search for different occurrences of events that are within a category they are interested in or for a specific known event. Once the registrant 410 finds the event they are interested in, race event 450, and performs a registration with the service provider 455 wherein their personal data is stored within a server 420. As the registration in this instance requires payment then a transaction of the registration process with service provider 455 includes execution of a financial transaction with a financial institution 440. Upon completion of the registration process a credential identifier 425 is transmitted from server 420 to credential provider 430 together with aspects of the personal data allowing the credential provider 430 to fabricate the credential 435 for the race event 450 including the credential identifier 425 and send it to the registrant 410. Subsequently, the registrant 410 may therefore employ the credential 435 to gain entry to the race event 450.

Upon completion of the race event 450 the eventer 460, typically the registrant 410, obtains scanned credential 445, for example by photographing the credential identifier 425 with a camera within their PED, and transmits this to server 420 using a software application in execution upon their PED. The software application(s) in execution upon server 420 upon receipt of scanned credential 445 automatically performs a registration process for the registrant 410 to another event associated with the race event 450. For example, if race event 450 was the Boston Marathon and the registrant had initially registered for the 2012 race then their re-registration would be for the 2013 race. If the re-registration required a further financial transaction, then this may be processed by financial institution with or without input from the registrant 410.

It would be evident to one skilled in the art that the credential provider 430 and service provider 455 may be same organization or parts of the same organization operating as different enterprises. Optionally, rather than the credential 435 being physically sent to the registrant 410 it may be electronically transmitted for presentation at the race event 450 wherein submission of their scanned credential 445 may therefore be through sending the electronically received credential 435 to an electronic address. It would be evident that some registrations may not require financial transactions associated with the registration, others may require additional information be provided, and others may require that the registrant also provide additional information when actually attending and registering for the event.

It would be evident to one skilled in the art that the re-registration process may be one automatically executed upon forwarding of the issued credential, e.g. credential 435, or may be executed with additional verification and/or confirmation processes by the registrant. In some embodiments of the invention where multiple subsequent occurrences of the event may exist, e.g. all remaining National Football League games that season at home for the New England Patriots rather than simply the next occurrence of the New England Patriots playing the same team as the event that the registrant just attended.

It would also be evident that the registrant may establish through a software system and/or software application preferences with respect to the different options for re-registration for a subsequent occurrence of the event. It would be further evident to one skilled in the art that the software system and/or software application may be part of the software registration processes offered by the service provider or it may be provided by another service provider and support interfaces to multiple service providers.

In a similar manner as discussed supra in respect of FIG. 2 also connected to the network 4000 are SOCNETs/SOMEs 2000. Accordingly, the registrant 410 may in association with their activities, such as registration, participation in race event 450, and subsequent re-registration for example, generate multimedia content which is posted to one or more SOCNETs/SOMEs 2000, such as Facebook™, Twitter™, YouTube™ etc., allowing followers of the one or more SOCNETs/SOMEs 2000 to view this posted/uploaded multimedia content. Such multimedia content may for example include Tweets, images, videos, photographs, and audio for example. Accordingly, the user may increase their SOCNET/SOME presence and/or relevancy through such posted/uploaded content. In other embodiments of the invention wherein the event that the registrant is participating in, has participated within, or will participate within includes a charity and/or fundraising elements then their fundraising progress and achievements may also be posted to their SOCNET/SOME as well as that relating to the charity/organization benefiting from the fundraising.

Figure 5:
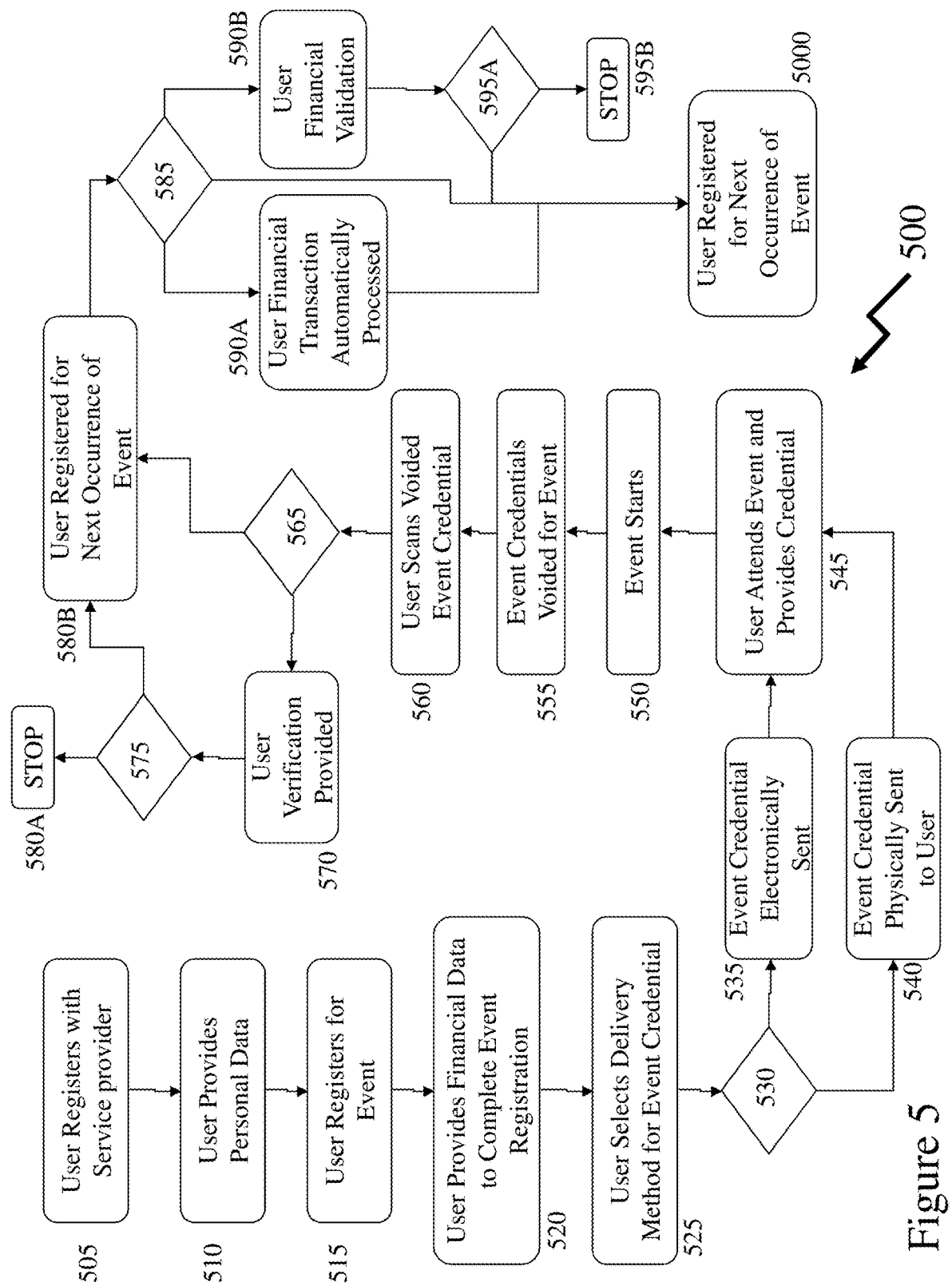
FIG. 5 depicts an exemplary flowchart for a user registration and re-registration for an event according to an embodiment of the invention.

Referring to FIG. 5 there is depicted an exemplary flowchart 500 for a user registration and re-registration for an event according to an embodiment of the invention. The process begins at step 505 wherein the user registers with a service provider and subsequently completes an event registration comprising in step 510 providing personal data, in step 515 selecting/registering for an event, in step 520 providing financial data to complete the registration process and then in step 525 selects the delivery method for delivery of the event credential. At step 530 the exemplary flowchart 500 determines whether electronic or physical delivery was selected wherein the process proceeds via either steps 535 and 540 respectively to achieve the required credential delivery. In each instance the exemplary flowchart 500 proceeds to step 545 wherein the user attends the event and provides the credential.

Accordingly, at step 550 the event for which the user starts (or attends) and then in step 555 the event credentials are voided. At step 560 the user scans the now voided credential, for example, at the end of the event and then determines in step 565 the process determines whether user verification is required for the re-registration. If in step 565 the determination is positive, then the process proceeds to step 570 wherein the user enters their verification data or otherwise proceeds to step 580B and automatically registers the user. From step 570 the process checks to determine in step 575 whether the credentials are correct or not wherein if they are the process proceeds to step 580B otherwise it proceeds to step 580A and terminates as an incorrect verification was provided. From step 580B the process proceeds to step 585 to determine whether a financial transaction associated with the re-registration is required or not. If no financial transaction is required, the process proceeds directly to step 5000 wherein the re-registration is complete. If a financial transaction is required and the user has previously selected an automatic option, then the process proceeds to step 590A processes the financial transaction and therein proceeds to step 5000. If user verification of the financial transaction is required, the process proceeds to step 590B wherein the user provides their verification which is verified in step 595A wherein a correct verification results in the process proceeding to step 5000 otherwise the process proceeds to step 595B.

Within the exemplary flowchart 5000 the credential for the current event is voided after the start of the event. Optionally, the voiding of the credential may be established at a predetermined point in time subsequent to the start of the event or it may be linked to the cessation of the event or a predetermined point in the event. Alternatively, the re-registration process may be authorized and/or accessible at a performed point in time which may for example be a time prior to the event, a time defined by the registrant process, or a time determined by the event organizer. Within the description of exemplary flowchart 500 the re-registration is presented as being associated with a single subsequent re-occurrence of the event, such as for example next year's marathon, next year's SuperBowl, or next food and wine festival. However, it would be evident that an event organizer may wish to leverage the user's current desire to re-register to upsell the user, such as for example, sending the user upon their re-registration details of an associated event, such as for example, a season pass or an annual pass. In other embodiments of the invention multiple other occurrences of an event may exist in addition to the particular event the one the user registered for, e.g. all remaining games for a football team that season in addition to the next annual meeting of the team with the opponent that the registrant was attending. In other instances, for example, a hockey team, the next meeting with the same opponent may be in a matter of weeks or months as there are multiple meetings within the same season. Accordingly, in such instances the user when re-registering may be provided with options as to the re-registration they wish to perform as well as outlining and/or offering other options.

Figure 6:
FIG. 6 depicts exemplary screenshot simulations of a software application upon a registrant's portable electronic device according to an embodiment of the invention.

Referring to FIG. 6 there are depicted first to fifth exemplary screenshot simulations 610, 620, 630, 640 and 650 respectively of a software application in execution upon a registrant's portable electronic device according to an embodiment of the invention. First screenshot simulation 610 depicts an electronic ticket received by a registrant for an event, New York Jets vs. New England Patriots with the NY Jets at home, wherein the event details 610A are presented together with event credential 610B, a re-register icon 610C, and an information bar 610D detailing date, temperature and current time. As evident from information bar 610D the current date/time is after the start time of the event for which the user was registered. Accordingly, the user selects the re-register icon 610C wherein they are presented with second screenshot simulation 620 presenting first and second options 620A and 620B respectively relating to either the next New York Jets game (vs. Arizona Cardinals) or next seasons game with the New England Patriots. In the event the user selects first option 620A then they are presented with fourth screenshot simulation 640 informing them the registration was processed and that the same seat has been reserved for them. If alternatively, the user had selected the second option 620B then they may be presented with either third or fifth screenshot simulations 630 and 650 respectively informing them that as soon as the 2013 game is scheduled they will advise the registrant. In third screenshot simulation 630 the user is advised that they are registered, and the same seat is reserved whilst in fifth screenshot simulation 650 they are advised that a better seat has been reserved for them. Accordingly, the event organizer may reward re-registration by offering a better seat wherein the event organizer's seat management system has reserved automatically seats associated with season ticket holders so that conflicts are, where possible, avoided.

It would be evident to one skilled in the art that other screens may be presented to the user including for example, but not limited to, those relating to user authentication and/or verification, financial transaction approval and/or verification, and event options such as for example other New York Jets games. Optionally, the initial electronic ticket presented to the user as depicted in first screenshot simulation 610 does not present the re-register icon 610C until a predetermined point of time occurs, such as described supra in respect of FIG. 5, including but not limited to relating to the event start, event completion, or predetermined point during the event and/or a predetermined occurrence, such as the event credential 610B being verified when the user registers at the event.

Figure 7:
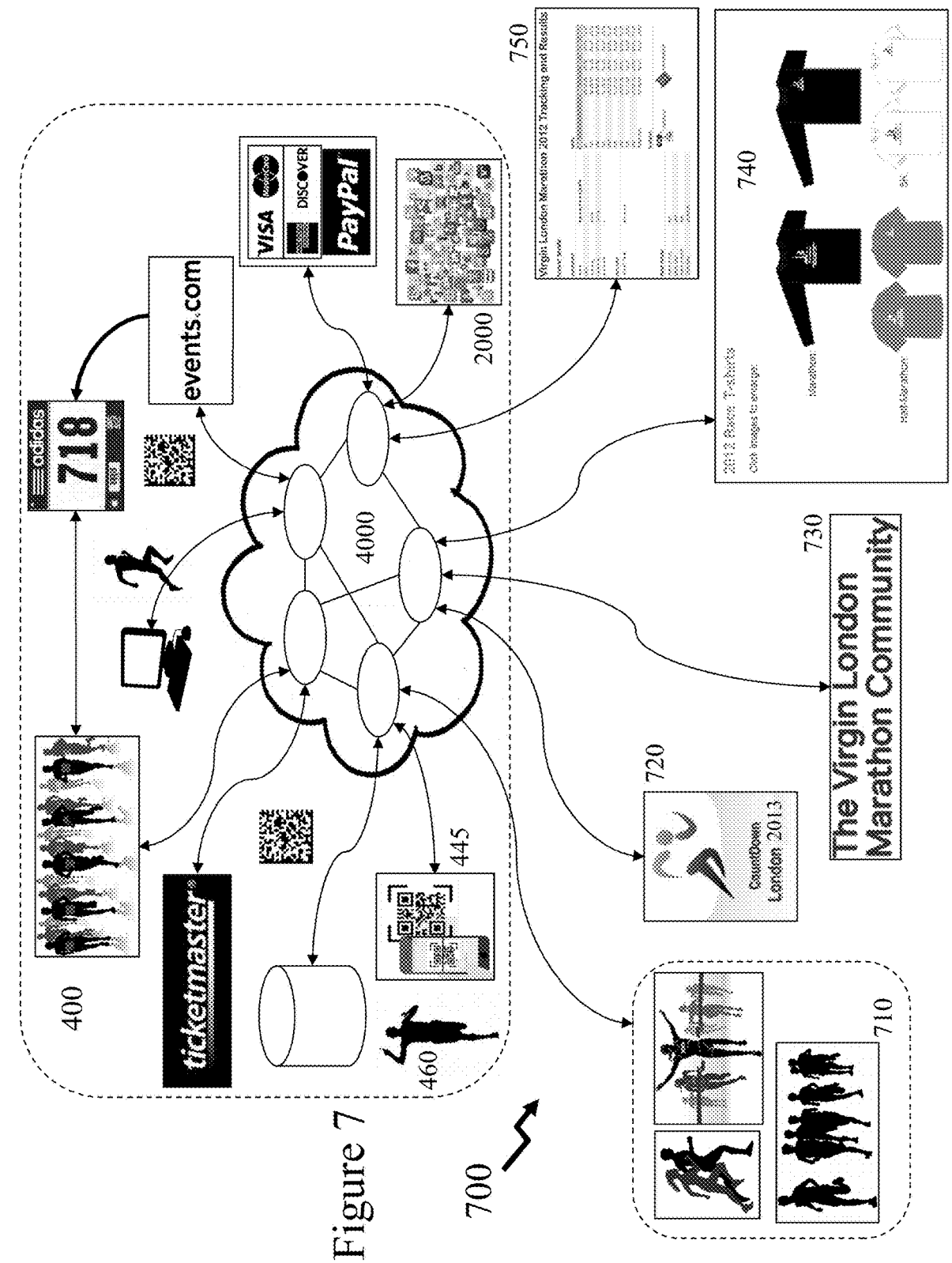
FIG. 7 depicts an exemplary association of event, registrant, event credential, service provider and third party service providers according to an embodiment of the invention.

Now referring FIG. 7 these is depicted an exemplary association 700 of race event, registrant, event credential, service provider, and third party service providers according to an embodiment of the invention. The association of race event, registrant, event credential, and service provider is depicted as embodiment 400 such as described above in respect of FIG. 4. However, upon submission of the scanned credential 445 by the eventer 460 in addition to the execution of the registration process for the registrant such as described above in respect of FIGS. 4 through 6 the registrant is provided with access to one or more third party service providers depicted as first to fifth providers 710 through 750 respectively. First provider 710 being access to a multimedia database comprising multimedia content, for example those taken by official photographers, of the event for which the registrant was registered and is currently taking part within or has just taken part within.

According to some embodiments of the invention the registrant's credential for the event may be exploited so that only those elements of multimedia content within which the registrant has been identified are presented to them. Such identification, for example, being via image recognition of the event credential being worn by the registrant such that it appears in the multimedia content captured during the event. Alternatively, facial recognition or recognition of other personal identifying features of the registrant may also be employed to establish their presence within the multimedia content so that if the registrant provides a facial image as part of the registration process or other information relating to these identifying features they can be identified. The processing of the multimedia content being achieved through backend processing within a software system and/or software application according to an embodiment of the invention.

Accordingly, from first provider 710 the registrant is able to obtain photographs, videos, etc according to the policies of the first provider 710 which may for example be free, with discount to race registrants, etc. Optionally, registrants purchasing items of multimedia content may be provided with additional finishing, framing, and shipment options which are not accessible to non-registrants. For example, if a race photograph is ordered then it is within a frame allowing the registrant to house their race medal within it.

Second provider 720 is access for the registrant as the result of their re-registration to an information resource for the event to which they registered in the re-registration process e.g. Countdown London 2013, having just completed the 2012 London marathon and re-registering for the 2013 London marathon. This information resource may for example link the registrant to travel, accommodation, and other service providers wherein as a result of their accessing through second provider 2013 they are offered preferred rates or special offers in addition to the standard services and rates. Third provider 730 represents event social media resources the registrant is provided access, in this instance "The Virgin London Marathon Community" wherein the Virgin Group of Richard Branson are the event's primary sponsor. Fourth provider 740 represents access provided to the registrant to a provider of souvenirs, e.g. race clothing such as t-shirts, sweatshirts, cups, lapel pins etc. According to some embodiments of the invention the registrant is provided with special offers and/or products unavailable generally to the general public such as for example customization of clothing to include their race credential for example.

Fifth provider 750 represents information provided to the registrant, in this example Virgin London 2012 Tracking and Results wherein the registrant accesses their stored data. As with other service providers the registrant by virtue of the access to fifth provider 750 through re-registration may be provided with additional information and options, e.g. provisioning of their split times rather than just overall race time or ability to print a certificate. Accordingly, re-registration of the registrant may provide the registrant with access to providers through a menu provided to them during the re-registration process or subsequently accessible to them. Said providers may provide special offers and/or special services/wares to re-registrants. Additionally connected to the network 4000 are SOCNETs/SOMEs such as described supra in respect of FIGS. 2 and 4 wherein in addition to those SOCNETs/SOMEs associated with embodiment 400 in FIG. 4 other SOCNETs/SOMEs associated with first to fifth providers 710 to 750 respectively may be followed by the registrant and/or have content posted to them by the registrant.

Within the descriptions supra in respect of embodiments of the invention described above in respect of FIGS. 4 through 7 the software system and/or software application is described as operating in conjunction with one event organizer, e.g. New York Jets, and service provider, e.g. TicketMaster™. However, it would be evident that event credentials may be provided by multiple service providers in relation to a single event, e.g. by the event organizer themselves, as well as by one or more direct registration parties, such as TicketMaster™ for example. In such instances the software system and/or software application may be operated by one or more of these direct registration parties and/or event organizer themselves as well as potentially a third party.

It would be evident that in some instances event credentials may be re-sold and/or brokered via one or more third party re-sellers, such as StubHub or VividSeats™ for example. In these instances, the software system and/or software application may block these purchasers from having re-registration rights or may still provide the re-registration option to the original registrant. However, in other instances a user may wish to gift an event credential, for example to a family member, and elect to optionally retain re-registration rights or transfer these to the individual to whom they have gifted the event credential. Accordingly, a user registered with a credential provider may elect when purchasing credentials for an event be offered options with respect to the re-registration process, including for example, immediate transfer to the individual whose details are provided for delivery of the credential, retain re-registration option with the purchaser, and provide an option for subsequent transfer to the individual to whom the registrant transfers the event credentials to. During this purchasing process the user may be asked to verify and/or amend previously established re-registration options to apply to the currently active event registration process or establish a custom set of options for this re-registration. For example, the user may have previously established that re-registration requires verification both of the event re-registration and any associated financial transaction. Alternatively, the user may have elected for automatic financial transaction verification for any transaction of value below $100.

It would be evident that in some re-registrations the details of the event are not currently available publicly or have not been established by the event organizer as yet. In these circumstances the user may be provided with the option of a completely automatic registration wherein they re-register and pay for the future occurrence at that point. Alternatively, they may be provided with the option to re-register and confirm their registration once the event details have been finalized and/or announced. The event organizer in the latter event whilst not having confirmations and/or advanced funds has direct feedback to the event in terms of the percentage of attendees interested in re-registering.

It would be evident that within the descriptions of embodiments of the invention as described above in respect of FIGS. 2 through 7 that the event credential provided to the registrant contains information relating not only to the event for which the event credential is valid, but also other information including, but not limited to, information relating to the event credential being valid and admitting the registrant to partake in the event, the particular nature of which may vary with the event and the event credential purchased, and information that associates to the software system and/or software application the event credential to the registrant (or the currently identified individual when the event credential has been gifted) such that the receipt of the event credential by the software system and/or software application allows the re-registration process to not only be performed but also to be associated to the registrant. This information, in combination with other information that may be embedded in the event credential, may prevent fraud through the process such that a third party cannot seek to leverage a single credential to purchasing multiple credentials for the next occurrence of the event.

Within the descriptions of FIGS. 2 through 7 and embodiments of the invention reference has been made to an event credential being provided to the registrant which is subsequently scanned or read in order to trigger the re-registration process as well as offering access to the other third party service providers. Examples of such event credentials may include, but not be limited to, race "bibs", name tags, race "tags", ticket stubs, electronic registration confirmations, and printed registration confirmations wherein said event credentials may comprise one or more codes including, but not limited to, a personal identification number, a barcode uniquely associated with the registrant, a barcode uniquely associated with the event, a barcode including at least registrant and event information, a Quick Response Code (QR Code) uniquely associated with the registrant, a QR Code uniquely associated with the event, and a QR Code including at least registrant and event information. It would be evident that other coding formats may be employed either as within the prior art now or as established in the future without departing from the scope of the invention as described herein. Such codes may represent data by varying the widths and spacings of parallel elements, commonly referred to as linear or one-dimensional (1D) barcodes, however other elements including rectangles, dots, hexagons and other geometric patterns may be employed in two dimensions (2D).

Within the descriptions of FIGS. 2 through 7 and embodiments of the invention reference is made to the imaging the event credential in order to obtain scanned credential 445, referring to FIG. 4. This imaged code may be sent directly and processed by the software system and/or software application upon the remote servers of the service provider or alternatively may be processed directly by a software application on the user's electronic device, PED or FED, in order to derive either data to be transmitted or a representation of the code to be transmitted. For example, a barcode may be reduced to a simple N-bit word or a QR code to M N-bit words.

Alternatively, according to other embodiments of the invention the loop back from the registrant to the service provider for re-registration may be implemented through another loop which may be achieved through a link provided to the registrant either during the initial registration process or sent to the registrant at a predetermined point in time after the event begins and/or ends. For example, the user may be sent a link within an email which when accessed requires them to enter a unique code provided to them as part of the event credential for example. In other variations social media applications may be employed, such as for example, a Facebook™ post relating to the event or a Twitter™ post relating to the event. The unique code may for example be their bib number or another aspect of the event credential, an identifier issued by the software system and/or software application associated with the registrant but bearing no relation to their identification to the event.

Within embodiments of the invention the triggering of links, posts, and other communications to the registrant may be established in dependence upon other factors rather than as described above in respect of time based triggers. For example, the registrants racing bib, license plate, face, or other elements may be scanned or employed as part of a recognition process, such that this is performed at the end of the race for example, such that their completion of the event triggers the provisioning of the communication to the registrant. Alternatively, the registrant has a device, such as one for example exploiting radio frequency identification (RFID) or wireless technology that may operate in conjunction with a timing mat or a similar element of the event the registrant is taking part within so that the registrant may then access the re-registration process. Outlined below are two such processes according to potential embodiments of the invention although others would be evident to one skilled in the art.

Process A: Registrant crosses the matt at the end of the race, a text message is sent to the registrant asking them to reply entering the code from their event registration, wherein the re-registration process is performed once their code is returned and verified.

Process B: Registrant crosses the matt at the end of the race, a RFID tag within their event credential logs their completion of the race, the logging triggers a text to the registrant stating that if they go to a kiosk then their re-registration process will be undertaken. At the kiosk their bib for example may be scanned or their face imaged.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed:

1. A server coupled to a communications network comprising a first microprocessor, the server executing first computer executable instructions which when executed configure the server to:

receive first registrant data from a first computer system connected to the communications network generated by a registrant relating to their registration for a first event;

initiate provisioning of a unique physical credential to the registrant relating to an authorization for the first event and which contains visual content identifying both the first event and the registrant;

receive a first digital representation of the visual content of unique physical credential issued to the registrant from a second computer system connected to the network;

transmit the first digital representation of the unique physical credential to the first computer system;

receive a verification of the first digital representation of the unique physical credential from the first computer system;

authorize the registrant's participation in the first event upon receipt of the verification of the first digital representation of the unique physical credential;

terminate the unique physical credential after the registrant's participation is authorised;

receive a second digital representation of the visual content of the now terminated unique physical credential issued to the registrant from a third computer system connected to the network;

transmit the second digital representation of the visual content of the now terminated unique physical credential issued to the registrant to the first computer system; and receive second registrant data from the first computer system connected to the communications network, the second registrant data generated by the first computer system in automatically registering the registrant for a second event based upon information stored within the first computer system associated with the registrant's registration for the first event and receipt of the second digital representation of the visual content of the now terminated unique physical credential.

2. The server connected to the communications network according to claim 1, further comprising the first computer system connected to the communications network comprising a second microprocessor, the first computer system executing second computer executable instructions which when executed configure the first computer system to:

perform a first registration process for the registrant in response to the registrant entering data during a registration process for the first event;

transmit to the server first registrant data comprising a first portion established in dependence upon the data entered by registrant during the registration process and a second portion relating to the first event;

receive the first digital representation of the unique physical credential from the server;

verify the first digital representation of the unique physical credential; and transmit a verification of the first digital representation of the unique physical credential to the server;

receive the second digital representation of the now terminated unique physical credential from the server;

verify the second digital representation of the now terminated unique physical credential;

automatically register the registrant for a second event based upon information stored within the first computer system associated with the registrant's registration for the first event upon verification of the second digital representation of the visual content of the now terminated unique physical credential; and transmit to the server the second registrant data generated by the first computer system upon automatically registering the registrant for the second event.

3. The server connected to the communications network according to claim 1, wherein the server terminates the unique physical credential upon at least one of when the registrant using the unique physical credential to attend the first event, termination of the first event, and after a first predetermined period of time from a designated start time for the first event.

4. The server connected to the communications network according to claim 2, wherein automatically registering the participant includes automatically executing a financial transaction to purchase a second unique physical credential for the second event.

5. The server connected to the communications network according to claim 1, further comprising additional first computer executable instructions which when executed configure the server to:

initiate provisioning of a second unique physical credential to the registrant relating to an authorization for the second event and which contains another set of visual content identifying both the second and the registrant.

6. The server connected to the communications network according to claim 1, wherein registration of the registrant for the second event using the second digital representation of the visual content of the now terminated unique physical credential is performed independent of whether any other details of the second event other that it will occur are known at that time.

7. The server connected to the communications network according to claim 2, further comprising additional second computer executable instructions which when executed configure the first computer system to:

present the registrant with each scheduled occurrence of the second event;

receive from the registrant an indication of the scheduled occurrences to register for; and automatically process a financial transaction relating to fees for registering for each indicated scheduled occurrent of the second event.

8. The server connected to the communications network according to claim 1, wherein the unique physical credential is a printed representation of a unique credential electronically delivered as part of at least one of an electronic message and an electronic ticket to an electronic address associated with the registrant during their registration process for the first event;

wherein the at least one of an electronic message and an electronic ticket when viewed prior to termination of the unique credential does not include an option for the registrant to indicate their registration to the second event and provisioning of a second representation of the unique physical credential issued; and the at least one of an electronic message and an electronic ticket when viewed after the termination of the unique physical credential includes an option for the registrant to indicate their registration to the second event by providing the second representation of the unique physical credential issued.

9. The server connected to the communications network according to claim 1, further comprising additional first computer executable instructions which when executed configure the server to:

provide to the registrant digital visual content within which the registrant is present acquired during the first event; wherein the digital visual content is stored upon at least one of a computer server associated with an organizer of the first event, a computer server associated with a social network comprising one or more sections associated with the first event, and a computer server associated with a third party associated with the first event.

10. The server connected to the communications network according to claim 1, further comprising
additional first computer executable instructions which when executed configure the server to: at least one of:
transmit an offer to the registrant upon receipt of the first registrant data, the offer relating to accessing one or more third party service providers associated with the first event; and
transmit an offer to the registrant upon receipt of the second registrant data, the offer relating to accessing one or more third party service providers associated with the second event.

11. The server connected to the communications network according to claim 1, wherein
the visual content forming part of the unique physical credential relating to at least one of the individual and the first event is at least one of a one-dimensional bar code, a two-dimensional bar code, and a code according to a predetermined format.

12. A first computer system connected to a communications network comprising a first microprocessor, the first computer system executing first computer executable instructions which when executed configure the first computer system to:
perform a first registration process for a registrant in response to the registrant entering data during a registration process for a first event;
transmit to a server connected to the communications network first registrant data comprising a first portion established in dependence upon the data entered by registrant during the registration process and a second portion relating to the first event;
receive a first digital representation of a unique physical credential from the server;
verify the first digital representation of the unique physical credential; and
transmit a verification of the first digital representation of the unique physical credential to the server;
receive a second digital representation of the now terminated unique physical credential from the server;
verify the second digital representation of the now terminated unique physical credential;
automatically register the registrant for a second event based upon information stored within the first computer system associated with the registrant's registration for the first event upon verification of the second digital representation of the visual content of the now terminated unique physical credential; and
transmit to the server the second registrant data generated by the first computer system upon automatically registering the registrant for the second event.

13. The first computer system connected to the communications network according to claim 12, comprising:
the server coupled to the communications network comprising a second microprocessor, the server executing second computer executable instructions which when executed configure the server to:
receive first registrant data from the first computer system connected to the communications network generated by the registrant relating to their registration for the first event;
initiate provisioning of the unique physical credential to the registrant relating to an authorization for the first event and which contains visual content identifying both the first event and the registrant;
receive the first digital representation of the visual content of unique physical credential issued to the registrant from a second computer system connected to the network;
transmit the first digital representation of the unique physical credential to the first computer system;
receive a verification of the first digital representation of the unique physical credential from the first computer system;
authorize the registrant's participation in the first event upon receipt of the verification of the first digital representation of the unique physical credential;
terminate the unique physical credential after the registrant's participation is authorised;
receive the second digital representation of the visual content of the now terminated unique physical credential issued to the registrant from a third computer system connected to the network;
transmit the second digital representation of the visual content of the now terminated unique physical credential issued to the registrant to the first computer system; and
receive second registrant data from the first computer system connected to the communications network, the second registrant data generated by the first computer system in automatically registering the registrant for a second event based upon information stored within the first computer system associated with the registrant's registration for the first event and receipt of the second digital representation of the visual content of the now terminated unique physical credential.

14. The first computer system connected to the communications network according to claim 13, wherein
the server terminates the unique physical credential upon at least of one when the registrant using the unique physical credential to attend the first event, termination of the first event, and after a first predetermined period of time from a designated start time for the first event.

15. The first computer system connected to the communications network according to claim 12, wherein
automatically registering the participant includes automatically executing a financial transaction to purchase a second unique physical credential for the second event.

16. The first computer system connected to the communications network according to claim 13, further comprising
additional first computer executable instructions which when executed configure the server to:
initiate provisioning of a second unique physical credential to the registrant relating to an authorization for the second event and which contains another set of visual content identifying both the second and the registrant.

17. The first computer system connected to the communications network according to claim 13, wherein
registration of the registrant for the second event using the second digital representation of the visual content of the now terminated unique physical credential is performed independent of whether any other details of the second event other that it will occur are known at that time.

18. The first computer system connected to the communications network according to claim 12, further comprising
additional second computer executable instructions which when executed configure the first computer system to:
present the registrant with each scheduled occurrence of the second event;

receive from the registrant an indication of the scheduled occurrences to register for; and automatically process a financial transaction relating to fees for registering for each indicated scheduled occurrent of the second event.

19. The first computer system connected to the communications network according to claim 13, wherein the unique physical credential is a printed representation of a unique credential electronically delivered as part of at least one of an electronic message and an electronic ticket to an electronic address associated with the registrant during their registration process for the first event; wherein the at least one of an electronic message and an electronic ticket when viewed prior to termination of the unique credential does not include an option for the registrant to indicate their registration to the second event and provisioning of a second representation of the unique physical credential issued; and the at least one of an electronic message and an electronic ticket when viewed after the termination of the unique physical credential includes an option for the registrant to indicate their registration to the second event by providing the second representation of the unique physical credential issued.

20. The first computer system connected to the communications network according to claim 13, further comprising additional first computer executable instructions which when executed configure the server to:

provide to the registrant digital visual content within which the registrant is present acquired during the first event; wherein the digital visual content is stored upon at least one of a computer server associated with an organizer of the first event, a computer server associated with a social network comprising one or more sections associated with the first event, and a computer server associated with a third party associated with the first event.

21. The first computer system connected to the communications network according to claim 13, further comprising additional first computer executable instructions which when executed configure the server to: at least one of:

transmit an offer to the registrant upon receipt of the first registrant data, the offer relating to accessing one or more third party service providers associated with the first event; and transmit an offer to the registrant upon receipt of the second registrant data, the offer relating to accessing one or more third party service providers associated with the second event.

22. The first computer system connected to the communications network according to claim 13, wherein the visual content forming part of the unique physical credential relating to at least one of the individual and the first event is at least one of a one-dimensional bar code, a two-dimensional bar code, and a code according to a predetermined format.

\* \* \* \* \*